US012759171B2

(12) United States Patent
Remmert et al.

(10) Patent No.: US 12,759,171 B2
(45) Date of Patent: Oct. 13, 2026

(54) GRIPPER DEVICE

(71) Applicant: ROLLS-ROYCE plc, London (GB)

(72) Inventors: Ariane Remmert, Derby (GB); Iain G Brown, Derby (GB); Pongsakorn Siripornpitak, Derby (GB); Richard Mecrow, Derby (GB)

(73) Assignee: ROLLS-ROYCE plc, London (GB)

( * ) Notice: Subject to any disclaimer, the term of this patent is extended or adjusted under 35 U.S.C. 154(b) by 1045 days.

(21) Appl. No.: 17/959,533

(22) Filed: Oct. 4, 2022

(65) Prior Publication Data

US 2023/0124447 A1 Apr. 20, 2023

(30) Foreign Application Priority Data

Oct. 15, 2021 (GB) ..................................... 2114779

(51) Int. Cl.
*B25J 15/06* (2006.01)
*B25J 9/06* (2006.01)
*B25J 15/00* (2006.01)

(52) U.S. Cl.
CPC ........... *B25J 15/0633* (2013.01); *B25J 9/065* (2013.01); *B25J 15/0023* (2013.01); *B25J 15/0608* (2013.01)

(58) Field of Classification Search
CPC ...... B25J 15/633; B25J 9/065; B25J 15/0023; B25J 15/0608
See application file for complete search history.

(56) References Cited

U.S. PATENT DOCUMENTS 4,561,686 A 12/1985 Atchley
2016/0052145 A1* 2/2016 Spicer .................. B23Q 3/1543 269/8
2018/0264643 A1* 9/2018 Rabani ................... B25J 9/1615
2019/0217485 A1 7/2019 Takahashi et al.
(Continued)

FOREIGN PATENT DOCUMENTS

DE 102016201541 A1 8/2017
JP 2013-220508 A 10/2013
(Continued)

OTHER PUBLICATIONS

English Translation of JP 2016112664 (Year: 2016).*
(Continued)

*Primary Examiner* — Gene O Crawford
*Assistant Examiner* — Sydney Jeanine Simmons
(74) *Attorney, Agent, or Firm* — Oliff PLC

(57) ABSTRACT

A particle gripper including a flexible surface membrane connected to a resiliently deformable neck portion which has a cavity filled with a phase change material, and at least one air tube, the flexible surface membrane and the phase change material are configured to deform around an object to be gripped; and wherein the at least one air tube is used for inflating and/or creating a vacuum within the cavity such that the cavity can be inflated so that the phase change material is forced against the flexible surface membrane to expand the flexible surface membrane, and a transition means which is applied to the phase change material in the cavity so that it changes phase of the material from a liquid to a solid so that object is gripped by the flexible surface membrane and the phase transition material.

12 Claims, 3 Drawing Sheets

(56) References Cited

U.S. PATENT DOCUMENTS

| | | | | |
|---|---|---|---|---|
| 2019/0308331 | A1* | 10/2019 | Hurwit | B25J 9/1697 |
| 2020/0215701 | A1 | 7/2020 | Takahashi et al. | |
| 2021/0122063 | A1 | 4/2021 | Tadakuma et al. | |

FOREIGN PATENT DOCUMENTS

| | | | | |
|---|---|---|---|---|
| JP | 2016112664 | A | * | 6/2016 |
| WO | 2015/006613 | A1 | | 1/2015 |

OTHER PUBLICATIONS

Nov. 4, 2024 Office Action issued in European Patent Application No. 22199042.7.

Jun. 30, 2022 Search Report issued in British Patent Application No. 2114779.8.

* cited by examiner

GRIPPER DEVICE

This specification is based upon and claims the benefit of priority from UK patent application Ser. No. 21/145,779.8 filed on 15 Oct. 2021, the entire contents of which are incorporated herein by reference.

BACKGROUND

Field of the Disclosure

The present disclosure concerns a gripper device. In particular the invention relates to a soft gripper for use on a robotic arm.

Background of the Disclosure

Pipelines and other confined spaces can become contaminated by particles or debris that have either entered the system from an external source or become detached from the system. The gripping of particles or debris in difficult to reach areas is often performed by a robotic arm. Attached to the end of the robotic arm is a hand-like gripper. However, if these grippers hit the side of a fragile component, they can result in more damage than would have been caused by the object if it had been left in situ. As such, there is a need for softer grippers to be developed that can be attached to the robotic arms.

Non-robotic grippers are also known. There are examples of these having a deformable head as shown in WO 2015/006613 A1. However, this deformable head is still connected to a rigid base body portion, which connects it to the arm. The presence of this rigid base body portion on the tool can have a similar effect to the hand of the robotic gripper if it contacts a delicate surface.

Another downside of the known non-robotic grippers is that as the deformable head extends along the plane of the base portion it means that it is limited in use in constricted spaces. As a consequence, it is desirable to develop a soft deformable gripper mechanism for attachment to a robotic arm, which may also be used in constricted spaces such as pipes.

SUMMARY OF THE DISCLOSURE

According to a first aspect there is provided a particle gripper comprising:

- a flexible surface membrane connected to a resiliently deformable neck portion which has a cavity filled with a phase change material, and at least one air tube,
- wherein the flexible surface membrane and the phase change material are configured to deform around an object to be gripped; and
- wherein the at least one air tube is used for inflating and/or creating a vacuum within the cavity such that the cavity can be inflated so that the phase change material is forced against the flexible surface membrane to expand the flexible surface membrane, and a transition means which is applied to the phase change material in the cavity so that it changes phase of the material from a liquid to a solid so that the object is gripped by the flexible surface membrane and the phase transition material.

The particle gripper may be connected to a robotic arm.

The robotic arm may be a continuum robotic arm or a snake arm robotic arm.

The resiliently deformable neck portion may be made of silicone.

A clamp may be attached to the resiliently deformable neck portion.

The clamp may be connected to a rod along which the at least one air tube runs.

The resiliently deformable neck portion may extend in a plane along the length of the air tube such that the flexible surface membrane expands in a direction perpendicular to the length of the air tube.

The flexible surface membrane may be made from rubber like material such as rubber, silicone or latex.

The phase change material may be a granular material, which becomes solid under a vacuum transition.

The phase change material may be a ferromagnetic fluid that undergoes a phase transition under the application of a current transition means.

According to a second aspect of the disclosure there is a method of gripping an object in a confined space using the particle gripper as descried above, the method comprising:

- positioning the particle gripper relative to the object to be gripped,
- inflating the flexible surface membrane using the air tube,
- positioning the gripper against the object to be gripped such that the flexible surface membrane and the phase change material surround a substantial portion of the object to be gripped,
- using the transitioning means to cause a phase change in the phase change material,
- and extracting the particle gripper from the confined space.

The transitioning means may comprise applying a vacuum to the phase transition material in order to induce the phase transition.

The transitioning means may comprise applying an electric current to the phase transition material in order to induce the phase transition.

The skilled person will appreciate that except where mutually exclusive, a feature described in relation to any one of the above aspects may be applied mutatis mutandis to any other aspect. Furthermore, except where mutually exclusive any feature described herein may be applied to any aspect and/or combined with any other feature described herein.

BRIEF DISCUSSION OF THE DRAWINGS

An Embodiment will now be described by way of example only, with reference to the Figures, in which.

Figure 4A:
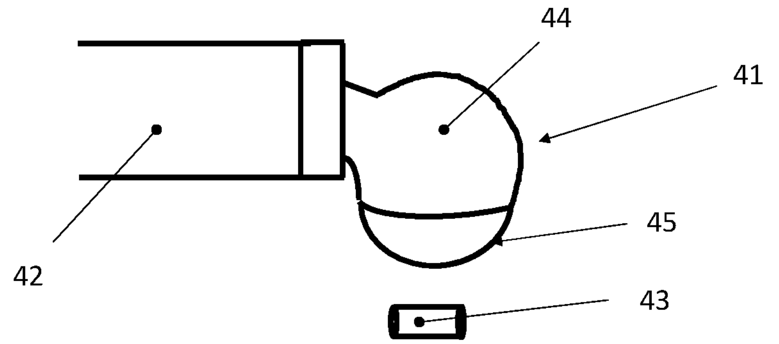
Figure 4B:
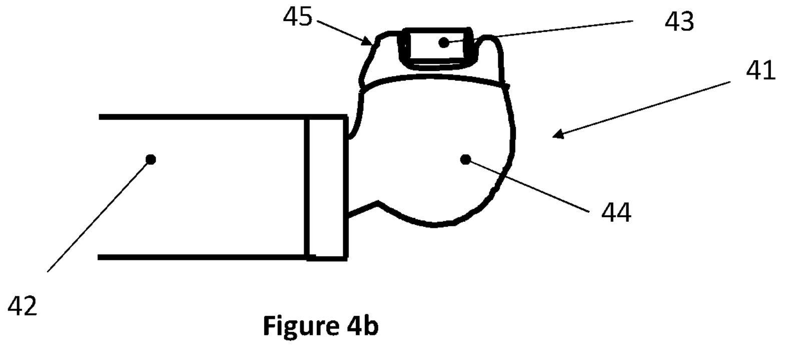

FIGS. 4*a* and 4*b* is a representation of a horizontal gripper tool of the present disclosure being used to pick up an object.

DETAILED DISCUSSION OF THE DISCLOSURE

In maintenance of nuclear power plants and/or other complex products such as gas turbine engines there is sometimes a need to remove debris or particles from inaccessible areas or from areas in which access would take considerable time to gain, i.e. through the removal of covers and other components. In such circumstances, typically the operator is unable to access the point at which the particle or debris is lodged. Consequently, it is common to use a robotic arm to access these areas. In particular, the use of snake arm or continuum robots is desirable as they can be manipulated to fit within tight areas and can be shaped to fit around obstructions. The other advantage with using a snake arm or continuum robot is that they can be manipulated to be used in a number of different configurations and conditions without the need for different setups. Furthermore, the bend and flexibility of the robot can be tailored to suit the purpose required. Gripping heads are then installed on the end of the robot to allow them to be able to grip the object or particle.

Figure 1:
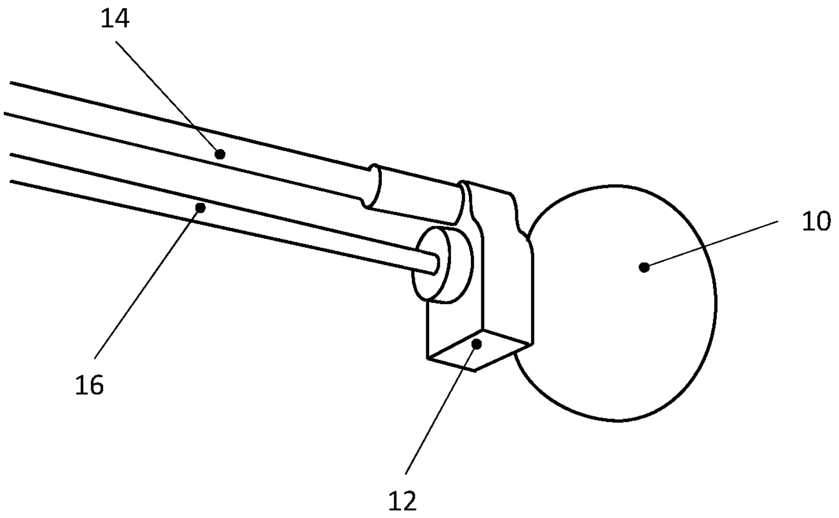
FIG. 1 is a representation of a first embodiment of the gripping device of the present disclosure attached to a pole.

FIG. 1 presents a first embodiment of a gripper of the present disclosure. The gripper is shown being attached to an extendible arm. In this example a vertical gripper head 10 is mounted via a clamp 12 onto the extendible arm 14. The term vertical denotes when the deformable surface extends in the same plane as the arm to which it is attached, whilst the term horizontal is used to refer to the deformable surface extending perpendicular to the plane of the arm. The vertical gripper head 10 comprises a rigid neck portion (22 in FIG. 2) which is connected to the arm 14, and a deformable front surface (24 in FIG. 2). The deformable front surface is able to deform in the presence of an object to be gripped. Between the rigid neck and the deformable front surface is an internal cavity. Inside the cavity is a material which is able to deform along with the surface in order to grip the object to be gripped. The material inside the cavity may be a granular phase change material which is able to flow around the object being gripped by the surface layer and then changes phase to become a solid so that the object is firmly gripped and so that it can be removed. An air hose 16 is supplied to the gripper head 10; this allows the gripper head to have a vacuum created within it or air blown into it to remove the vacuum. The use of a vacuum allows the granular phase transition material to change from a fluid into a solid. Although the arm presented in FIG. 1 is rigid, it could be attached to any suitable length of pole. Alternatively, it could also be attached to any suitable arm or robotic arm. In particular, it could be mounted to a snake arm or continuum arm robot. In such a case the air tube and/or electrical cables may be run through the central section of the robotic arm. The use of a continuum arm robot allows the gripper to be manipulated in three dimensions. Consequently, the gripper can be manipulated to be positioned at any location in pipework or within a machine that is not easily accessible through normal means.

Figure 2:
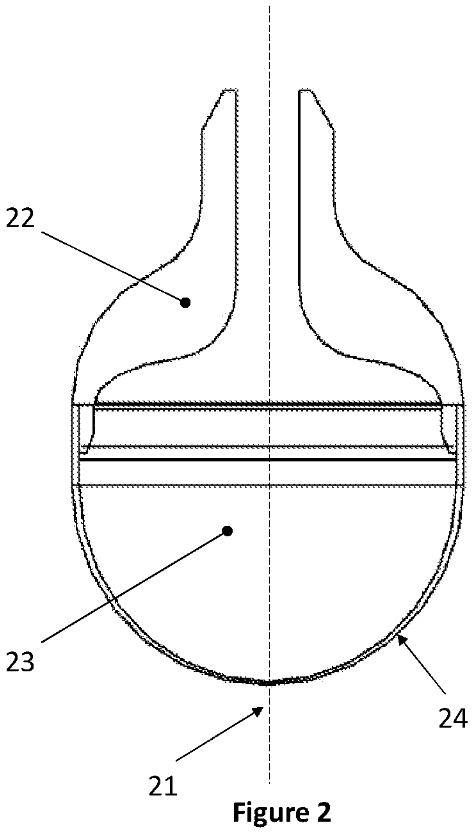
FIG. 2 is a representation of a vertical gripping device of the present disclosure.

With reference to FIG. 2, an embodiment of a gripper of the present disclosure is displayed. In this configuration the gripper head is vertically extending, that is to say that the head extends along the plane of the robotic arm 21. This is the same configuration as that presented in FIG. 1, but with the head shown in greater detail. The gripper comprises a neck portion 22, which has a hollow cavity 23. The neck portion is made of a resiliently deformable material. For example, the neck portion may be made from a silicone material or any other suitable material having similar properties. Alternatively, the neck portion may be made from a rigid material. The construction of the neck portion will depend on the delicacy of the system into which the gripper is to be applied. The neck portion may be made from rubber or plastic like materials. Surrounding the outside of the neck portion is a flexible surface membrane 24. The flexible membrane may be made from a rubber like material such as rubber, silicone or latex. The membrane surface needs to be made of a material that is tough enough that it will not break or rip if it touches the side of a sharp object that is to be gripped, but still needs to be flexible enough to be able to deform around the object. The cavity within the neck portion is filled with a phase transition material. The phase transition material may be a granular material that changes from a fluid to a solid under the application of a vacuum. This phenomenon is known as particle jamming. Alternatively, the phase transition material may be a ferromagnetic fluid which changes from a fluid to a solid through the application of a current. Consequently, if such a fluid is used an electrical connection is required to be inserted into the neck portion. This can follow the same routing as the air cable. As such, the cable can pass through the arm of the robot. Alternatively, the cable may be routed along the outside of the arm. Internal routing is preferred to protect the cable. If a phase transition granular material is used the neck portion also features an air tube that allows air supply to be moderated into the neck section. This allows for the phase change material to be moved within the cavity and allows it to expand into the flexible membrane. This movement causes the outside of the surface membrane to expand until it contacts an object to be gripped. At this point it is able to deform around the object. The material can then undergo a phase transition and the object will be securely gripped by the gripper.

Figure 3:
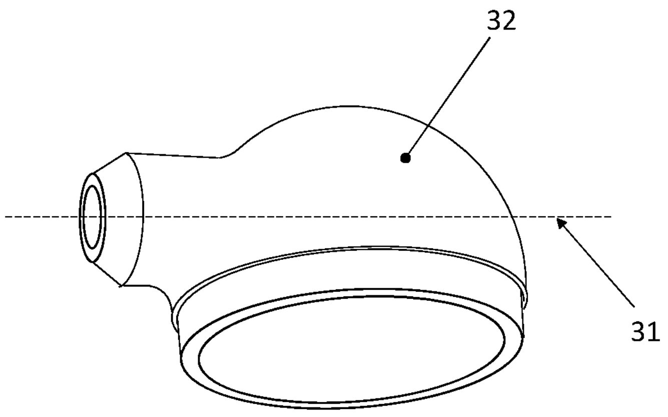
FIG. 3 is a representative of the neck portion of a horizontal gripping device of the present disclosure.

The use of a vertical gripper is useful for directly gripping objects that are directly in front of the gripper. However, due to space constraints in objects such as pipes the head of a vertical gripper cannot be contorted to be able to grip particles at the side of the pipe. Consequently, in such confined spaces a vertical head gripper cannot be used. In FIG. 3 a gripper is shown for use in such constricted spaces. In this case the neck portion 32 is in a horizontal configuration. This means that the flexible membrane is able to expand in an axis that is perpendicular to the axis of the length of the robotic arm 31. This configuration allows the gripper to grab objects that are at the side of a pipe and the head does not need to be contorted to grip an object at the side of the pipe. The remaining construction of the gripper portion is identical to that of the vertical gripper. The horizontal gripper may be connected to a suitable rotation means, such that the gripper can be rotated through 360° around the axis of the arm. This allows the gripper to be rotated to any position so that it can pick up debris at any position within a cylinder or a pipe. The use of a resiliently deformable material for the neck portion means that the neck portion can be rested against the side of a pipe without the risk of damaging the cylinder or pipe. Furthermore, it also reduces the chance of damage to the flexible membrane from any rough sides of pipe or cylinder. Once the object has been picked up, the gripper can be rotated back to a neutral position in order for the object to be extracted.

FIGS. **4*a* and 4*b* display the gripper of FIG. 3 in use. In this case the gripper is in the horizontal configuration as shown in FIG. 3. Here the gripper 41 is connected to a robotic arm 42. In FIG. 4*a* the gripper is in the pre gripping state with the phase transition in its fluid state. In such a case the flexible membrane has the fluid near to the surface, so that the flexible membrane is expanded and is in its gripping configuration. Once the gripper is in this state it can be rotated so that the flexible membrane is pointing towards the object 43 that is to be picked up. With the gripper in this position the resiliently deformable neck portion 44 faces in the opposite direction, so that it can protect the flexible membrane against any rough surface in the space where there is the object to be picked up. If the space is confined the neck may rest against the wall of the pipe or space. Therefore, the presence of the resiliently deformable neck increases the resilience of the gripper, which will in turn increase the lifespan of the gripper. With the gripper in this orientation the gripper can then be moved onto the object. As the gripper moves over the object the flexible membrane 45** deforms along with the phase transition fluid that is positioned behind the flexible membrane. This movement of the phase transition fluid and the flexible membrane allows the object to be surrounded by the membrane and encased by the phase transition fluid. The phase transition fluid can then undergo the phase transition from a fluid to a solid. Consequently, the object can then be held in the gripper as the phase transition fluid is now solid. The gripper can then be rotated and removed from the space so that the object can be collected. The gripper head may be equipped with at least one camera so that the positioning of the head can be controlled. In this the at least one camera allows the operator to see the positioning of the head and then control the gripper around the object to be gripped. In order to assist with the positioning of the particle gripper the camera may be associated with an imaging system. Such an imaging system may be the use of a fibreoptic imaging system that can provide a real time view of the position of the head of the gripper to an operator.

Such a device is useful in the removal of foreign materials that have the potential to cause mechanical damage. Also, due to the soft fluidic head it is suitable to grip objects of a large range of geometries. The device may also be suitable for use in gas turbine engines. Alternatively, the device may be used in other industrial applications in which access is restricted, such as chemical plants or within complex objects such as gas turbine engines or in pipe networks. The use of the gripper head in its particular location will determine the size of the gripper that is used. It will also determine which arm can be attached to the head. The size of the gripper head may be of any suitable size.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

We claim:

1. A particle gripper comprising:

a flexible surface membrane connected to a resiliently deformable neck portion which has a cavity filled with a phase change material, and at least one air tube, the flexible surface membrane and the phase change material are configured to deform around an object to be gripped; and wherein the at least one air tube is used for inflating and/or creating a vacuum within the cavity such that the cavity can be inflated so that the phase change material is forced against the flexible surface membrane to expand the flexible surface membrane, and a transition means which is applied to the phase change material in the cavity so that it changes phase of the material from a liquid to a solid so that object is gripped by the flexible surface membrane and the phase transition material, and wherein the resiliently deformable neck portion extends in a plane along the length of the air tube such that the flexible surface membrane expands in a direction perpendicular to the length of the air tube such that a portion of the flexible surface membrane opposite the neck portion can grasp the object.

2. The particle gripper as claimed in claim 1, wherein the particle gripper is connected to a robotic arm.

3. The particle gripper as claimed in claim 2, wherein the robotic arm is a continuum robotic arm or a snake arm robotic arm.

4. The particle gripper as claimed in claim 1, wherein the resiliently deformable neck portion is made of silicone.

5. The particle gripper as claimed in claim 1, wherein a clamp is attached to the resiliently deformable neck portion.

6. The particle gripper as claimed in claim 5, wherein the clamp is connected to a rod along which the at least one air tube runs.

7. The particle gripper as claimed in claim 1, wherein the flexible surface membrane is made from rubber like material such as rubber, silicone or latex.

8. The particle gripper as claimed in claim 1, wherein the phase change material is a granular material, which becomes solid under a vacuum transition.

9. The particle gripper as claimed in claim 1, wherein the phase change material is a ferromagnetic fluid that under goes a phase transition under the application of a current transition means.

10. A method of gripping an object in a confined space using a particle gripper, the method comprising:

positioning the particle gripper relative to the object to be gripped, wherein:

the particle gripper comprises a flexible surface membrane connected to a resiliently deformable neck portion which has a cavity filled with a phase change material, and at least one air tube, the flexible surface membrane and the phase change material are configured to deform around the object to be gripped, the at least one air tube is used for inflating and/or creating a vacuum within the cavity such that the cavity can be inflated so that the phase change material is forced against the flexible surface membrane to expand the flexible surface membrane, and a transition means which is applied to the phase change material in the cavity so that it changes phase of the material from a liquid to a solid so that object is gripped by the flexible surface membrane and the phase transition material, and the resiliently deformable neck portion extends in a plane along the length of the air tube such that the flexible surface membrane expands in a direction perpendicular to the length of the air tube such that a portion of the flexible surface membrane opposite the neck portion can grasp the object, inflating the flexible surface membrane using the air tube, positioning the gripper against the object to be gripped such that the flexible surface membrane and the phase change material surround a substantial portion of the object to be gripped, using the transitioning means to cause a phase change in the phase change material, and extracting the particle gripper from the confined space.

11. The method of claim 10, wherein the transitioning means is applying a vacuum to the phase transition material in order to induce the phase transition.

12. The method of claim 10, wherein the transitioning means is applying an electric current to the phase transition material in order to induce the phase transition.

* * * * *